INVENTORS:
MICHEL OLETTE
CHRISTIAN GATELLIER

By: Michael S. Striker
Attorney

Dec. 28, 1971  M. OLETTE ET AL  3,630,874
DEVICE FOR DETERMINING THE ACTIVITY OF OXYGEN IN MOLTEN METALS
Filed Nov. 15, 1968  2 Sheets-Sheet 2

INVENTORS:
MICHEL OLETTE
CHRISTIAN GATELLIER

By: Michael S. Heike
Attorney

United States Patent Office 3,630,874
Patented Dec. 28, 1971

3,630,874
DEVICE FOR DETERMINING THE ACTIVITY OF OXYGEN IN MOLTEN METALS
Michel Olette and Christian Gatellier, St. Germain-en-Laye, France, assignors to Institut de Recherches de la Siderurgie Francaise, St. Germain-en-Laye, France
Filed Nov. 15, 1968, Ser. No. 776,175
Claims priority, application France, Nov. 17, 1967, 128,578
Int. Cl. G01n 27/46
U.S. Cl. 204—195                              1 Claim

ABSTRACT OF THE DISCLOSURE

An expendable electrochemical cell for immersion into molten metal to determine the activity of oxygen therein comprise a tube of solid electrolyte which is immersed into a bath of molten metal and confines a reference substance containing oxygen whose partial pressure at various temperatures is known, and an electrode which is exposed to molten metal upon immersion of the cell. A thermocouple in the tube is surrounded by the reference substance and its branches are connected to terminals provided on a heat-resistant insulating support for the tube and electrode. The electromotive force is measured across one of the terminals and the electrode, and the temperature of molten metal is measured across the terminals.

BACKGROUND OF THE INVENTION

The present invention relates to improvements in devices for determining the activity of oxygen in molten metal. More particularly, the invention relates to improvements in electrochemical cells.

It is known to employ electrochemical cells for intermittent measurements of the activity of oxygen in baths of molten metal. Such measurements may be carried out for the purpose of calculating the oxygen content. Serious problems arise when a cell is to be used for repeated measurements, mainly because a crust of metal solidifies on the surface of the cell upon withdrawal from the bath. Thus, it is necessary to insure that the crust melts during subsequent immersion into molten metal before the measurement is taken. Repeated formation and melting of crusts changes the characteristics of the cell and affects the accuracy of measurement. Moreover, the interval required to insure complete melting of a crust which develops upon removal of the cell following a preceding measurement is often so long that the next measurement cannot take place at the desired instant. Repeated thermal shocks to which a reusable cell is subjected affect its mechanical strength, particularly the strength of solid electrolyte which is an essential component of each cell. It was found that the reliability of second, third and further measurements is reduced to such an extent that the cost involved in the production of a reusable cell is much too high. On the other hand, all presently known cells are so expensive that it is considered uneconomical to discard them after a single use.

SUMMARY OF THE INVENTION

It is an object of our invention to provide an electrochemical cell which is so inexpensive that it can be discarded after a single use.

Another object of the invention is to provide an expendable electrochemical cell which is just as accurate or even more accurate than presently known cells and which can furnish measurements regarding the activity of oxygen in and the temperature of a bath of molten metal practically without any delay.

A further object of the invention is to provide an electrochemical cell which can be mass-produced in available machinery in such a way that each series-produced cell will yield reproducible measurements.

The improved electrochemical cell comprises a support preferably consisting of insulating and highly heat-resistant material and having a coupling element for connection to an elongated carrier which facilitates introduction of the cell into a bath of molten metal, a preferably tubular container of solid electrolyte mounted on the support and having an outer side which is exposed to molten metal, a reference substance confined in the container and containing oxygen whose partial pressure at various temperatures is known, a thermocouple having two branches surrounded by the reference substance and a hot junction in contact with the wall of the container and an electrode mounted on the support to come into direct contact with molten metal in response to immersion into a bath. The branches of the thermocouple are connected with conductors which are embedded in the material of the support, and a further conductor which is also embedded in the support is connected with the electrode. A shield which melts in the bath protects the electrode and the container during passage through the layer of slag which floats on molten metal.

The novel features which are considered as characteristic of the invention are set forth in particular in the appended claim. The improved electrochemical cell itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
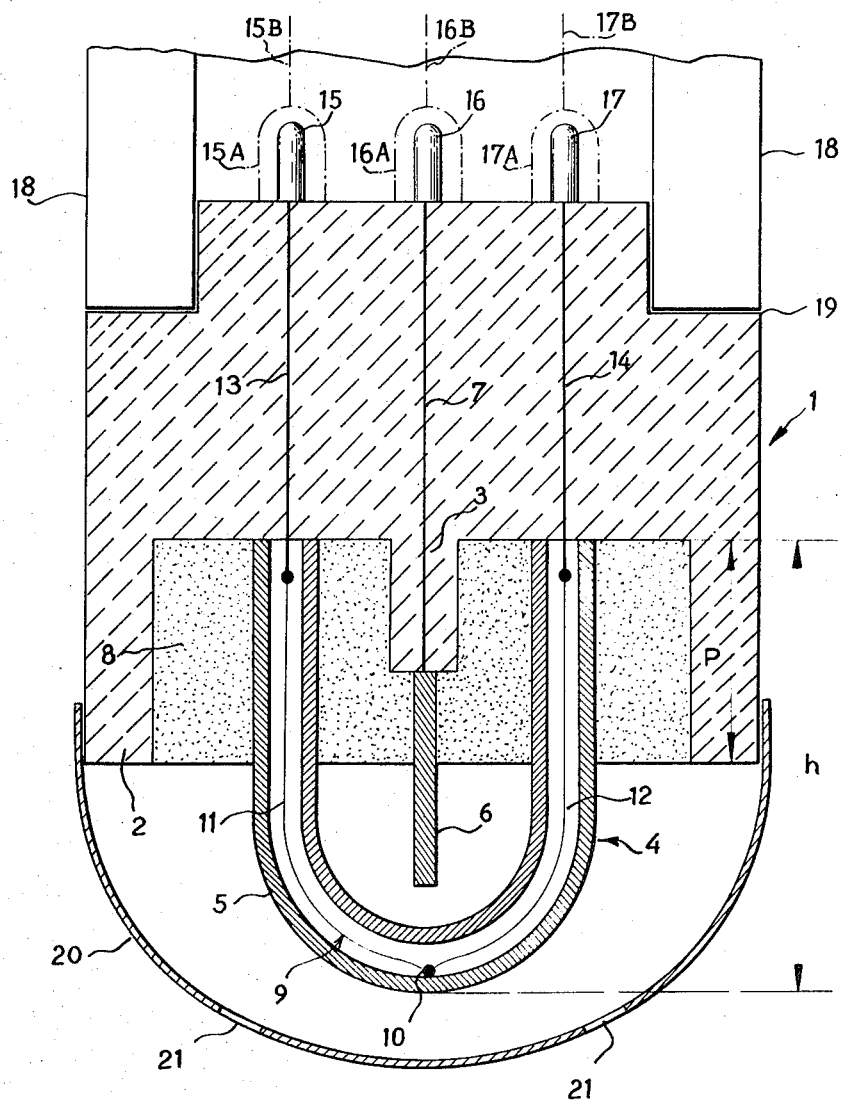
FIG. 1 is an enlarged axial sectional view of an electrochemical cell which embodies one form of our invention.

The electrochemical cell of FIG. 1 comprises a housing or support 1 of insulating material having a tubular portion 2 surrounding a centrally located projection or stud 3. The parts 2 and 3 extend from the same side of the main body portion of the support 1. A U-shaped tubular container 4 has two parallel arms which extend into the annular space between the tubular portion 2 and projection 3 and an arcuate central part or web 5 which extends beyond the end face of the tubular portion 2. The wall of the container 4 constitutes an active surface of solid electrolyte and consists, for example, of zirconia which is stabilized with lime. The depth P of the space surrounded by the tubular portion 2 of the support 1 is less than the length $h$ of the container 4. When the cell is immersed into a bath of liquid metal, the arcuate web 5 is in direct contact with metal. A center electrode 6 is mounted on and extends beyond the projection 3 toward but short of the web 5. This electrode 6 is connected with a conductor 7 which is embedded in the material of the support 1 and is connected with a centrally located male terminal 16 at the rear or upper side of the support. A filler 8 of refractory cement surrounds the arms of the container 4 and the electrode 6 in the spaced which is surrounded by the tubular portion 2. A thermocouple 9 in the container 4 has a hot junction 10 in contact with the container wall and two branches 11, 12 each of which extends through one arm of the container. Conductors 13, 14 which are connected to the branches 11, 12 are embedded in the material of the support 1 and extend to male terminals 15, 17 which are accessible at the rear side of the support. The thermocouple 9 permits determination of operating temperature of the cell which, in the present instance, corresponds substantially to that of molten metal since the temperature at the inner side of the wall of the container 4 is only slightly less than the temperature of material into which the cell is immersed.

The terminals 15, 16 and 17 are electrically connected with a suitable measuring system whose female terminals 15A, 16A, 17A are shown by phantom lines. The conductors 15B, 16B, 17B connecting the terminals 15A–17A with the measuring system extend through an elongated hollow tubular carrier 18 for the support 1. The rear side of the support 1 constitutes a coupling element provided with an annular shoulder 19 in abutment with the front end face of the carrier 18. As shown, the coupling element is separably inserted into the open end of the carrier.

A cupped protective shield 20 of metallic material is applied around the tubular portion 2 to enclose the exposed part of the container 4 and the electrode 6. This shield serves to protect the parts 4, 6 against mechanical and thermal shocks during passage through the layer of slag on top of the bath of molten metal. Once the cell is immersed into molten metal, the shield 20 melts and permits direct contact between the bath and the parts 4, 6. Apertures or windows 21 in the shield 20 permit escape of air which expands in response to heating during introduction of the cell into molten metal. The shield 20 also serves to prevent contamination of the container 4 while the cell penetrates through the layer of slag. Contamination of the container 4 by slag is undesirable because the thermodynamic activity of slag in oxygen is different from the activity in molten metal. Thus, the cell would fail to indicate the activity of oxygen in molten metal if the container 4 were not shielded during passage through the layer of slag which floats on the metallic bath.

The electromotive force is measured across the terminals 15, 16 or 16, 17, and the temperature of molten bath is measured across the terminals 15, 17.

The cell of our invention determines the activity of oxygen in molten metal by a comparison with the activity of a reference substance surrounding the branch 11 and/or 12 of the thermocouple 9. Thus, the container 4 accommodates a reference substance containing oxygen whose partial pressure at various temperatures is known. The reference substance may be in a fluid or solid state. For example, such reference substance may consist of air, pure oxygen, a mixture of oxygen with one or more other gaseous substances, or a mixture of an oxide with a metal or one or more other oxides. For example, the container may be filled with a mixture of Ta and $Ta_2O_5$. The activity of oxygen in the reference substance is known for the entire range of temperatures which are measured across the terminals 15, 17 when the cell is immersed into a bath of liquid metal.

By way of example, the diameter of the support may be about 30 millimeters, the external diameter of the container 4 may be about 3 millimeters, and the internal diameter of the container need not exceed 1.5 millimeters. The length of the exposed part of the container 4 (as seen in the longitudinal direction of the cell) need not exceed 10 millimeters, and the distance between the arms of the container need not exceed 15 millimeters. It will be seen that the cell is very small and compact so that the cost of materials employed for its construction is low and the cell can be mass-produced for a single utilization. Another advantage of the cell with dimensions as outlined above is that the thremal gradient across the wall of the container 4 is extremely small so that the cell need not be provided with any temperature correcting means. Also, the thermal inertia of the cell is negligible, i.e., the temperature in the container 4 rises to equal the temperature of molten metal immediately after the cell is immersed into a bath.

When the measurement is completed, the coupling element of the support 1 is detached from the carrier 18 and the latter is ready to be affixed to a fresh cell. In other words, each of a series of successive measurements is preferably carried out with a fresh expendable cell which contributes significantly to the correctness of measurements.

Savings in the amounts of solid electrolyte (container 4) and in the amounts of noble metal, particularly platinum (thermocouple 9) are of particular importance in order to bring about such reduction in cost that the cell can be discarded after a single use. The terminals 15A–17A are readily separable from terminals 15–17 to facilitate rapid replacement of the cell with a fresh cell.

The relationship between thermodynamic activity of oxygen and the electromotive force of the cell can be determined in a well known manner by the Nernst equation. The oxygen content can be calculated upon determination of such activity. As a matter of fact, the measuring instruments which are connected with the terminals 15A–17A can be calibrated to indicate the oxygen content.

The center electrode 6 may consist of platinum, iron, molybdenum, tungsten or other suitable metal.

Figure 2:
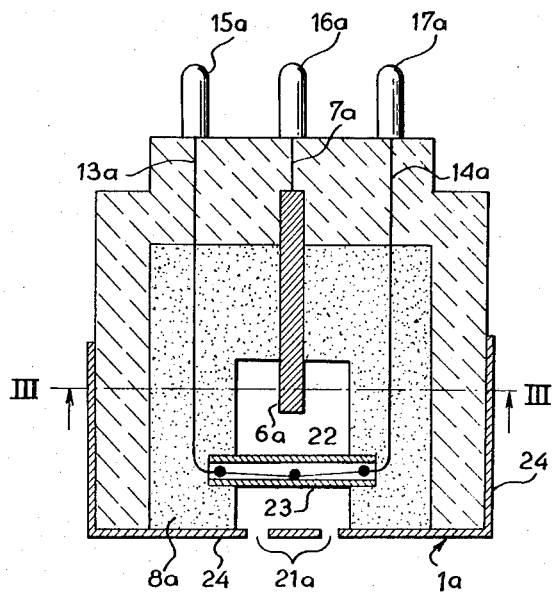
FIG. 2 is an enlarged axial sectional view of a second cell.
Figure 3:
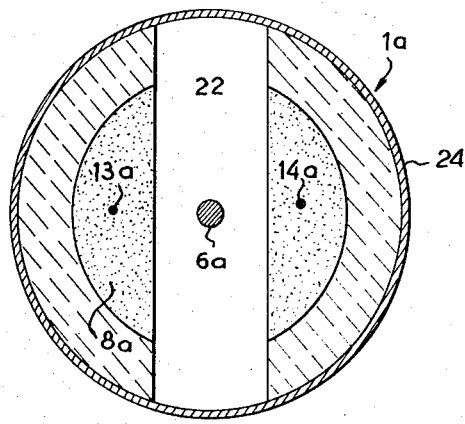
FIG. 3 is a sectional view as seen in the direction of arrows from the line III—III of FIG. 2.

FIGS. 2 and 3 illustrate a second expendable electrochemical cell whose housing or support $1a$ is provided at its forward end with a diametrically extending channel or space 22. This channel 22 accommodates a straight tubular container 23 consisting of solid electrolyte and a center electrode $6a$. The numerals, $7a$, $8a$ and $13a$–$17a$ denote parts which correspond to similarly numbered parts of the cell shown in FIG. 1. An advantage of the cell shown in FIGS. 2 and 3 is that the support $1a$ need not be provided with a central projection and that the container 23 is a straight tube; this simplifies the production of such parts and contributes to a further reduction in the cost of the cell.

The parts $6a$ and 23 are fully accommodated in the channel 22 and are protected during passage through the layer of slag by a cupped shield 24 which is telescoped onto the support $1a$ and melts in the metallic bath so that molten metal can penetrate into the channel 22. The shield 24 has apertures $21a$ and seals the ends of the channel while the cell is caused to pass through the layer of slag. The supports 1 and $1a$ consist of an insulating material which is capable of resisting the temperature of molten metal. The cell of FIGS. 2 and 3 is even more compact and even less expensive than the cell of FIG. 1.

Figure 4:
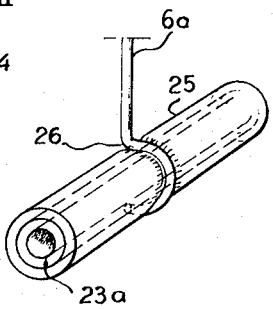
FIG. 4 is a perspective view of a portion of a third cell which constitutes a modification of the cell shown in FIGS. 2 and 3.

FIG. 4 illustrates a container $23a$ which is a straight tube of solid electrolyte and is partially surrounded by a porous tubular shell 25 of refractory material. The shell 25 has a circumferentially extending groove or gap 26 to permit direct contact between molten metal and solid electrolyte. The center electrode $6a'$ extends close to the gap 26, i.e., into close proximity of the exposed part of the container $23a$. The structure shown in FIG. 4 can be incorporated in the cell of FIGS. 2 and 3 to replace the parts $6a$ and 23.

It is clear that the improved cell is susceptible of many further modifications without departing from the spirit of our invention. For example, the support 1 or $1a$ may be made of a variety of materials as long as its material can resist the temperature of molten metal and as long as that portion of the support in which the conductors 7, 13 and 14 or $7a$, $13a$ and $14a$ are embedded can insure proper electrical insulation of these conductors from each other.

Without further analysis, the foregoing will so fully reveal the gist of the present invention that others can, by applying current knowledge, readily adapt it for various applications without omitting features which fairly constitute essential characteristics of the generic and specific aspects of our contrbiution to the art.

What is claimed as new and desired to be protected by Letters Patent is set forth in the appended claim:

1. An electrochemical cell, particularly an expendable cell for determining the activity of oxygen in baths of molten metal, comprising a support of heat-resistant material; a U-shaped tube of solid oxide electrolyte having an outer side which is exposed to molten metal when the cell is immersed into a bath; a reference substance confined in said tube, said reference substance containing oxygen whose pressure at various temperatures is known; a thermocouple provided in said tube and having two branches surrounded by said reference substance; and an electrode arranged to contact molten metal when the cell is immersed into a bath, said tube and said electrode being carried by said support.

References Cited

UNITED STATES PATENTS

| | | | |
|---|---|---|---|
| 3,347,767 | 10/1967 | Hickam | 204—195 |
| 3,400,054 | 9/1968 | Ruka et al. | 204—1.1 |
| 3,458,422 | 7/1969 | Proctor | 204—195.1 |
| 3,464,008 | 8/1969 | Meysson et al. | 204—195 |
| 3,468,780 | 9/1969 | Fischer | 204—195 |

FOREIGN PATENTS

| | | | |
|---|---|---|---|
| 21,673 | 4/1961 | Germany. | |
| 48,083 | 5/1966 | Germany | 204—195 |

OTHER REFERENCES

Filterer: "Reprint from J. of Metals," August 1966, pp. 1–6.

TA-HSUNG TUNG, Primary Examiner

U.S. Cl. X.R.

204—1 T